(12) United States Patent  
Kim

(10) Patent No.: US 11,317,048 B2
(45) Date of Patent: Apr. 26, 2022

(54) IMAGE SENSING DEVICE

(71) Applicant: SK hynix Inc., Icheon-si (KR)

(72) Inventor: Hyeon-June Kim, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 223 days.

(21) Appl. No.: 16/657,364

(22) Filed: Oct. 18, 2019

(65) Prior Publication Data

US 2020/0304744 A1 Sep. 24, 2020

(30) Foreign Application Priority Data

Mar. 20, 2019 (KR) .......................... 10-2019-0031884

(51) Int. Cl.
*H04N 5/378* (2011.01)
*H04N 5/341* (2011.01)

(52) U.S. Cl.
CPC ............. *H04N 5/378* (2013.01); *H04N 5/341* (2013.01)

(58) Field of Classification Search
CPC . H04N 5/353–3537; H04N 5/235–243; H04N 5/378; H04N 5/3355; H04N 5/3745–37455; G03B 7/00–28; G03B 2207/00–005; H03M 1/00–645
USPC ................................. 341/155–172
See application file for complete search history.

(56) References Cited

U.S. PATENT DOCUMENTS

| 2013/0020469 | A1 | 1/2013 | Okura et al. |
| 2014/0016010 | A1 | 1/2014 | Uchida |
| 2015/0008308 | A1* | 1/2015 | Huang ................ H03M 1/0863 250/208.1 |

FOREIGN PATENT DOCUMENTS

| CN | 1866748 A | 11/2006 |
| CN | 101378465 A | 3/2009 |
| KR | 10-0588751 | 6/2006 |
| KR | 10-2016-0118430 | 10/2016 |

OTHER PUBLICATIONS

Office Action dated Feb. 23, 2022 in Chinese Patent Application No. 201911199114.2, 13 pages, with English translation.

* cited by examiner

*Primary Examiner* — Xi Wang
(74) *Attorney, Agent, or Firm* — Perkins Coie LLP

(57) ABSTRACT

An image sensing device is provided to comprise: an image sensing region including a first pixel and a second pixel that produce a first pixel signal and a second pixel signal, respectively, in response to reception of light incident on the image sensing region; and a signal processing circuit electrically coupled to the image sensing region and operable to convert the first pixel signal and the second pixel signal to a first digital output and a second digital output, respectively, the signal processing circuit including a first node configured to receive the first pixel signal and the second pixel signal and a second node configured to receive ramp signals used for conversion of the first pixel signal and the second pixel signal.

20 Claims, 15 Drawing Sheets

IMAGE SENSING DEVICE

CROSS-REFERENCE TO RELATED APPLICATION

This patent document claims priority under 35 U.S.C. § 119 to Korean Patent Application No. 10-2019-0031884, filed on Mar. 20, 2019, the disclosure of which is incorporated herein by reference in its entirety.

TECHNICAL FIELD

Various embodiments of the disclosed technology relate to a semiconductor design technique including an image sensing device.

BACKGROUND

Image sensing devices capture images using the photosensitive property of semiconductor. Image sensing devices may be classified into charge-coupled device (CCD) image sensors and complementary metal-oxide semiconductor (CMOS) image sensors. CMOS image sensors allow both analog and digital control circuits to be directly implemented on a single integrated circuit (IC), making CMOS image sensors the most widely used type of image sensor.

SUMMARY

Various embodiments of the disclosed technology are directed to an image sensing device that is improved in terms of speed and power when converting a pixel signal into a digital signal, i.e., analog to digital conversion (ADC), and an operating method thereof.

In one aspect, an image sensing device is provided to comprise: an image sensing region including a first pixel and a second pixel that produce a first pixel signal and a second pixel signal, respectively, in response to reception of light incident on the image sensing region; and a signal processing circuit electrically coupled to the image sensing region and operable to convert the first pixel signal and the second pixel signal to a first digital output and a second digital output, respectively, the signal processing circuit including a first node configured to receive the first pixel signal and the second pixel signal and a second node configured to receive ramp signals used for conversion of the first pixel signal and the second pixel signal; and a check circuit coupled to the signal processing circuit and operable to check a validity of a ramp signal applied to the second node for the conversion of the second pixel signal and provide a check result, and wherein the signal processing circuit is configured to repeatedly adjust, during a first period, the second pixel signal applied to the first node or the ramp signal applied to the second node until the check result indicates the ramp signal as valid, and to generate one or more most significant bits (MSBs) of the second digital output based on i) previous one or more MSBs of the first digital output and ii) the number of times that the ramp signal or the second pixel signal has been adjusted.

In another aspect, an image sensing device is provided to comprise: a first sampling circuit configured to sample a pixel signal and output a sampled pixel signal to a first node; a second sampling circuit configured to sample a ramp signal and output a sampled ramp signal to a second node; a signal processing circuit coupled to the first node and the second node and configured to generate a digital signal based on the sampled pixel signal and the sampled ramp signal; and a voltage generating circuit coupled to the second node and configured to determine a start level of the sampled ramp signal based on one or more previous most significant bits (MSBs) included in a previous digital signal.

In another aspect, a method for operating an image sensing device is provided. The method comprises: (a) receiving a current pixel signal and a ramp signal, the ramp signal having an initial level determined based on information included in a previously processed digital output obtained by processing a previous pixel signal; (b) determining, during a check period, whether the ramp signal is valid or not; (c) adjusting, during a shift period, the ramp signal or the current pixel signal by a preset shift level when the determination indicates that the ramp signal is invalid; (d) selectively repeating operations (b) and (c) until the determination indicates that the ramp signal is valid; and (e) generating a current digital output including one or more MSBs obtained based on information included in the previously processed digital output and the number of adjustments.

DETAILED DESCRIPTION

Various embodiments of the disclosed technology are described below in more detail with reference to the accompanying drawings. These embodiments are provided so that this disclosure is thorough and complete, and fully conveys the scope of the present invention to those skilled in the art.

Moreover, it is noted that the terminology used herein is for the purpose of describing the embodiments only and is not intended to be limiting of the invention. As used herein, "connected/coupled" refers to one component not only directly coupling another component but also indirectly coupling another component through an intermediate component. It will be further understood that the terms "comprises," "comprising," "includes" and/or "including" when used in this specification, indicate the presence of stated features, but do not preclude the presence or addition of one or more other non-stated features. In addition, as used herein, singular forms are intended to include the plural forms as well, unless the context clearly indicates otherwise.

An image sensing device may include an image sensing region, for example, a pixel region including pixels that are arranged in rows and columns. The image sensing region may generate photocharges in response to receiving light incident to the pixel region. The photocharges generated in the image sensing region may be transferred as the electrical image signals for the subsequent processing including analog-digital conversion (A/D conversion).

The A/D conversion region of the image sensing device may be electrically coupled to the image sensing region and convert the pixel signals provided from the pixel region to digital outputs. In the disclosed technology, the A/D conversion region performs the A/D conversion for a current pixel by utilizing a value related to a previous pixel. For example, for two pixels including a first pixel and a second pixel that output a first pixel signal and a second pixel signal, respectively, in response to the reception of an incident light, the A/D conversion region provides a first digital output of the first pixel signal first and then provides a second digital output of the second pixel signal based on the first digital output of the first pixel signal. In some implementations, one or more most significant bits (MSBs) from the first digital output can be used to perform the A/D conversion for the second pixel signal. By utilizing information obtained from the previously processed digital output, the disclosed technology can provide an image sensing device highly efficient in terms of power saving and operation speed.

Figure 1:
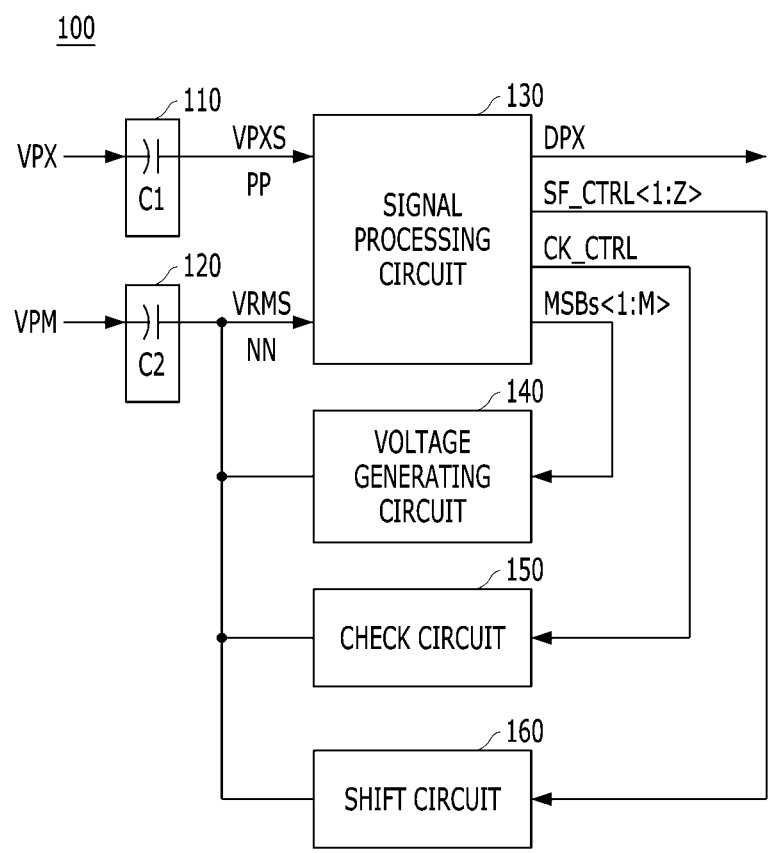
FIG. 1 is an example of a block diagram illustrating an image sensing device in accordance with an embodiment.

FIG. 1 is an example of a block diagram illustrating an image sensing device 100 in accordance with an embodiment.

Referring to FIG. 1, the image sensing device 100 may include an A/D conversion region including a sampling region including a first sampling circuit 110, a second sampling circuit 120, a signal processing circuit 130, a voltage generating circuit 140, a check circuit 150, and a shift circuit 160. In some implementations, the sampling region may be omitted or replaced with other components which perform the similar functions. FIG. 1 shows only a portion of the A/D conversion region included in the image sensing device 100. Referring to FIG. 1, the signal processing circuit 130 includes a first node PP and a second node NN. The first node PP receives a pixel signal from a corresponding pixel in the pixel region. The second node NN receives a ramp signal that is compared with a corresponding pixel signal for providing the A/D conversion of the corresponding pixel signal. Since the sampling region can be omitted, the ramp signal and the pixel signal in various implementations of this patent document may correspond to the ramp signal and the pixel signal before the sampling or after the sampling, respectively.

The first sampling circuit 110 may be coupled to the pixel region and the signal processing circuit 130. As an example, the sampling circuit 110 receives the second pixel signal from the second pixel and operates to sample the second pixel signal VPX and output the sampled pixel signal VPXS to the first node PP of the signal processing circuit. For example, the first sampling circuit 110 may include a capacitor C1. The second sampling circuit 120 may be coupled to the signal processing circuit 130 and sample the ramp signal VRM, and output the sampled ramp signal VRMS to a second node NN of the signal processing circuit 130. For example, the second sampling circuit 120 may include a capacitor C2.

The signal processing circuit 130 may generate the digital output DPX based on the sampled pixel signal VPXS and the sampled ramp signal VRMS. The signal processing circuit 130 may be coupled to at least one of the voltage generating circuit 140, the check circuit 150, or the shift circuit 160. The voltage generating circuit 140, the check circuit 150, and the shift circuit 160 are designed to operate during corresponding periods of the A/D conversion, as will be discussed in more detail later in this patent document.

To generate the digital output DPX of a particular pixel signal, e.g., the second pixel signal, the signal processing circuit 130 utilizes information of the previously processed digital output, e.g., the digital output of the second pixel signal. In some implementations, the information of the previously processed digital output may include one or more previous most significant bits MSBs<1:M> in the previously processed digital output. For the A/D conversion of a next pixel signal, the signal processing circuit 130 may be designed such that when the signal processing circuit 130 generates the digital output of a current pixel signal, information in the generated digital output including one or more most significant bits MSBs<1:M> are provided to the voltage generating circuit 140. In FIG. 1, for the A/D conversion of a current pixel signal, the signal processing circuit 130 is coupled to the voltage generating circuit 140 and configured to provide the information including one or more MSBs of the previously processed digital output to the voltage generating circuit 140. The signal processing circuit 130 may be further coupled to a check circuit and output a check control signal CK_CTRL to the check circuit 150 for the signal conversion period A/D. In some implementations, the signal processing circuit 130 may output one or more shifting control signals SF_CTRL<1:Z> to the shift circuit 160 for the signal conversion period A/D. The detailed operations of the signal processing circuit 130 to provide the second digital output DPX will be explained with reference to FIG. 2.

The voltage generating circuit 140 may be coupled to the second node NN of the signal processing circuit 130. The voltage generating circuit 140 may determine or set an initial level of the currently sampled ramp signal VRMS based on the previously processed digital output, e.g., the first digital output. In some implementations, the voltage generating circuit 140 may determine the initial level of the currently sampled ramp signal VRMS based on at least one of the most significant bits MSBs<1:M> of the previously processed digital output, e.g., first digital output. The voltage generating circuit 140 may perform its operation during an initial period $P_{initial}$.

The check circuit 150 may be coupled to the second node NN of the signal processing circuit 130. The check circuit 150 may check validity of the voltage level of the currently sampled ramp signal VRMS in response to the check control signal CK_CTRL. The check circuit 150 may perform its operation during a checking period $P_{check}$. In response to the check control signal CK_CTRL from the signal processing circuit 130, the check circuit 150 may check the validity of the currently sampled ramp signal VRMS based on whether a difference between the current level of the sampled ramp signal VRMS and the voltage level of the sampled pixel signal VPXS falls within a predetermined range. The predetermined range may be a voltage range corresponding to a coarse unit of 1 MSB. The predetermined range may be the minimum unit of the MSBs, (1 LSB size of MSBs, i.e., full scale of the LSBs). For example, when the most significant bits MSBs<1:3> containing 3 bits are inputted as the MSBs of the first digital output to the voltage generating circuit 140, the coarse unit of 1MSB, may correspond to ⅛ of an allowable voltage range of the sampled pixel signal VPXS.

The shift circuit 160 may be coupled to the second node NN of the signal processing circuit 130. The shift circuit 160 may shift (or adjust) the level of the currently sampled ramp signal VRMS based on the shifting control signals SF_CTRL<1:Z>. For example, the shift circuit 160 may increase or decrease the level of the currently sampled ramp signal VRMS by the preset shifting voltage, e.g., the coarse unit of 1MSB, based on the validity check result from the check circuit 150. The shift circuit 160 may perform its operation during a shifting period $P_{shift}$.

Figure 2:
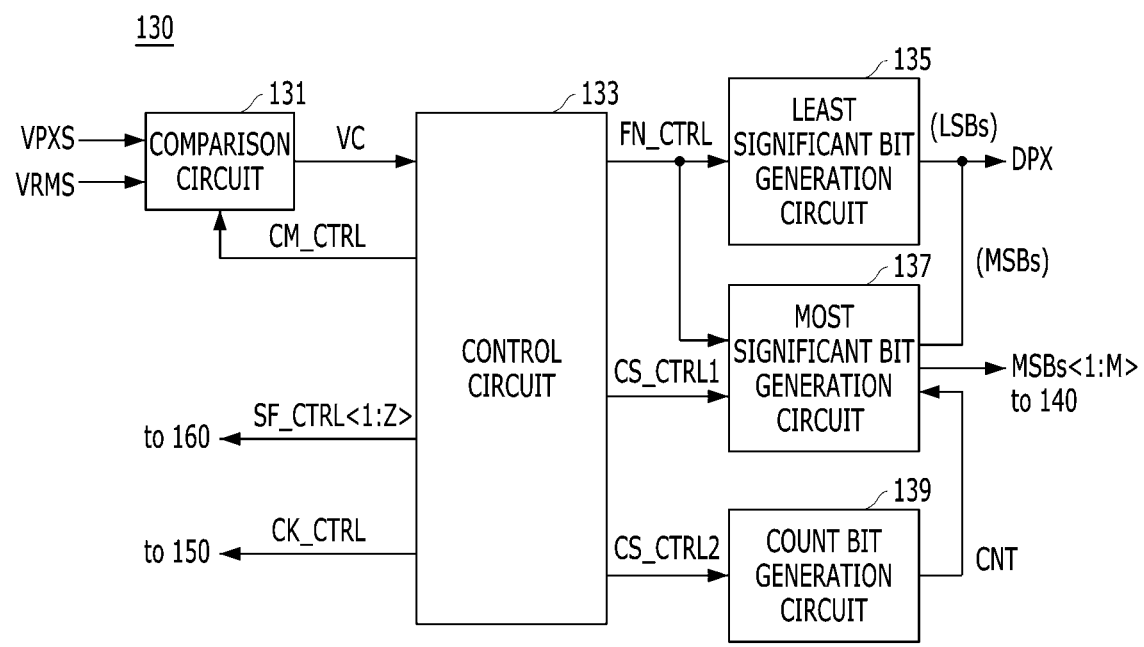
FIG. 2 is an example of an internal configuration diagram illustrating a signal processing circuit shown in FIG. 1.

FIG. 2 is an example of a configuration diagram illustrating the signal processing circuit 130 shown in FIG. 1.

Referring to FIG. 2, the signal processing circuit 130 may include a comparison circuit 131, a control circuit 133, a least significant bit (LSB) generation circuit 135, a most significant bit (MSB) generation circuit 137 and a count bit generation circuit 139.

The control circuit 133 may be electrically coupled to the comparison circuit 131, a control circuit 133, a least significant bit (LSB) generation circuit 135, a most significant bit (MSB) generation circuit 137 and a count bit generation circuit 139 and generate corresponding control signals to invoke the operations of the respective circuit. The A/D conversion for converting a current pixel signal to its digital output may proceed during a coarse period and a fine period. The term, coarse period and the fine period, are used to distinguish the two periods from each other based on the voltage change rate of the ramping signal VRMS during the respective periods. For example, the ramp signal VRM may be designed to have a smaller change rate during a fine period $P_{fine}$ as compared to that during a coarse period. The coarse period includes an initial period $P_{initial}$, the checking period $P_{check}$, and the shifting period $P_{shift}$ in which the voltage generating circuit 140, the check circuit 150, and the shift circuit 160 perform their operations, respectively. The control signals invoking the respective periods are generated by the control circuit 133 and the generated control signals are provided from the control circuit 133 to the respective circuits, as will be further discussed in this patent document.

The comparison circuit 131 may compare the sampled pixel signal VPXS with the sampled ramp signal VRMS and generate a comparison signal VC based on the comparison result. The comparison operation may be invoked by the comparison control signal CM_CTRL provided form the control circuit 133. The comparison circuit 131 may compare the sampled pixel signal VPXS with the sampled ramp signal VRMS. The comparisons performed by the comparison circuit may be various depending on when the comparisons are made, e.g., in which period of the A/D conversion the comparisons are made. For example, the comparison circuit 131 may compare the sampled pixel signal VPXS with the initial level of the sampled ramp signal VRMS. In some examples, the comparison circuit 131 may compare the sampled pixel signal VPXS with the shifted level of the sampled ramp signal VRMS. In some examples, during the fine period Prim, the comparison circuit 131 may compare the sampled pixel signal with the sampled ramp signal VRMS having a smaller voltage change as compared to that during the coarse period. The comparison circuit 131 may generate the comparison signal VC based on the comparison result.

The control circuit 133 may generate first and second coarse control signals CS_CTRL1 and CS_CTRL2 based on the comparison signal VC to operate the most significant bit generation circuit 137 and the count bit generation circuit 139. The control circuit 133 may generate a fine control signal FN_CTRL based on the comparison signal VC to invoke the fine period Prime of the signal conversion period A/D. Based on the comparison signal VC, the control circuit 133 may generate the check control signal CK_CTRL and shifting control signals SF_CTRL<1:Z> to proceed the checking period Paled, and the shifting period $P_{shift}$, respectively.

The LSB generation circuit 135 may generate the least significant bits LSBs of the second digital output DPX, based on the fine control signal FN_CTRL. For example, the LSB generation circuit 135 may include a counter. The counter may count the fine control signal FN_CTRL during the fine period Prime, and generate the least significant bits LSBs based on the count result.

The MSB generation circuit 137 may generate the MSBs of the currently processed digital output, e.g., the second digital output. In addition, the MSB generation circuit 137 may output the most significant bits MSBs<1:M> of the previously processed digital output, e.g., the first digital output, to the voltage generating circuit 140 for the initial period $P_{initial}$, based on the first coarse control signal CS_CTRL1. To generate the MSBs of the second digital output, the MSB generation circuit 137 may determine the current most significant bits MSBs by update the previous most significant bits MSBs<1:M> to based on a count bit CNT. For example, the MSB generation circuit 137 may include a latch and an adder-subtractor. The latch may store the previous most significant bits MSBs<1:M> and the current most significant bits MSBs. The adder-subtractor may generate the current most significant bits MSBs by adding the count bit CNT or subtracting the count bit CNT from the previous most significant bits MSBs<1:M>.

The count bit generation circuit 139 may generate the count bit CNT for the shifting period $P_{shift}$, based on the second coarse control signal CS_CTRL2. For example, the count bit generation circuit 139 may generate the count bit CNT based on the number of activations of the second coarse control signal CS_CTRL2. The number of activations of the second coarse control signal CS_CTRL2 indicates the number of times that the level of the currently sampled ramp signal VRMS has been adjusted or shifted. For example, the count bit generation circuit 139 may include a counter.

Figure 3:
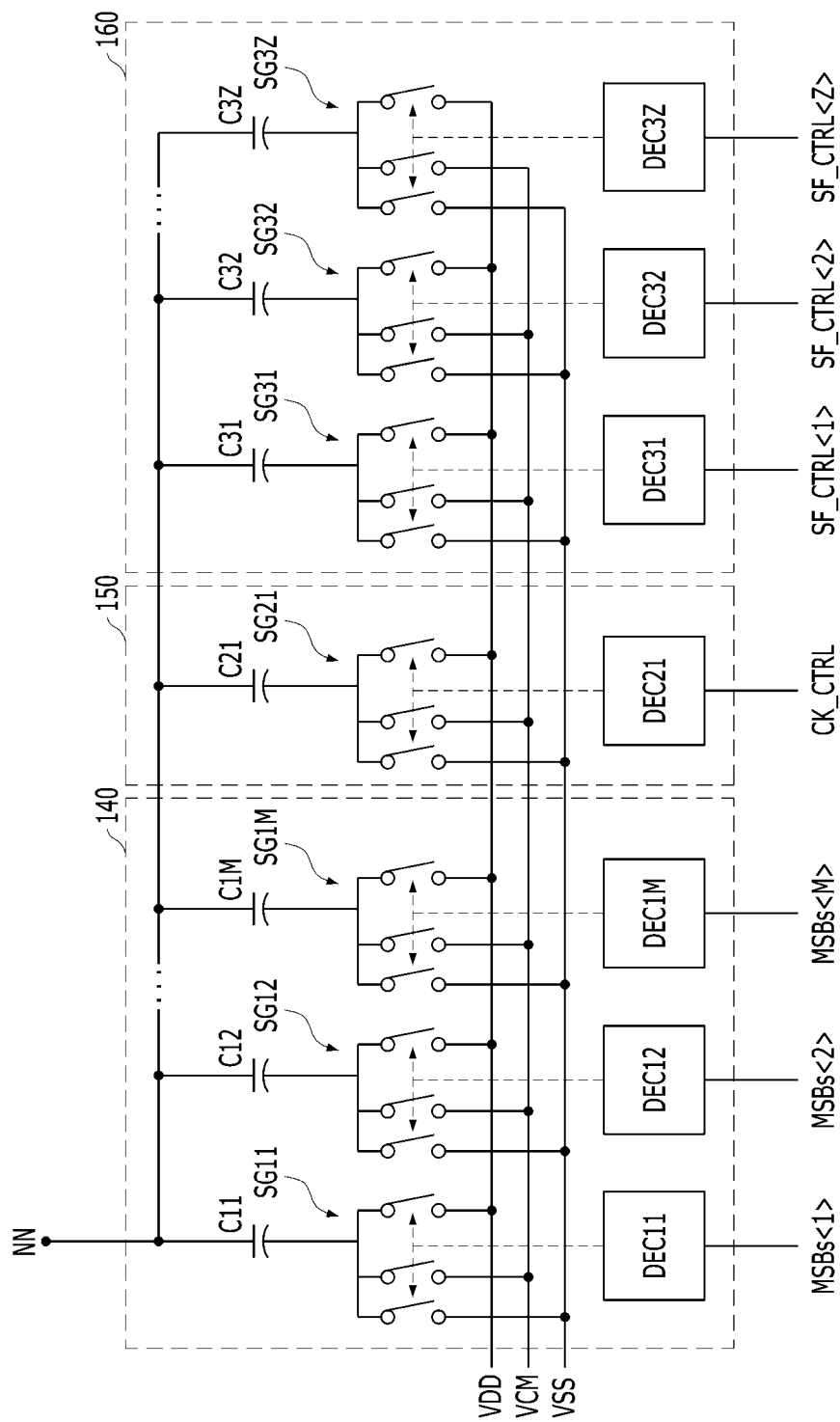
FIG. 3 is an example of an internal configuration diagram illustrating a voltage generating circuit, a check circuit and a shift circuit shown in FIG. 1.

FIG. 3 is an example of an internal configuration diagram illustrating the voltage generating circuit 140, the check circuit 150 and the shift circuit 160 which are shown in FIG. 1.

Referring to FIG. 3, the voltage generating circuit 140 may determine an initial level of the ramp signal, based on the previous most significant bits MSBs<1:M>. For example, the voltage generating circuit 140 may include a first digital-to-analog converter (DAC). The first DAC may include a plurality of decoders DEC11 to DEC1M, a plurality of switch groups SG11 to SG1M and a plurality of capacitors C11 to C1M. For convenience in description, the first decoder DEC11, the first switch group SG11 and the first capacitor C11 are representatively described below. The first decoder DEC11 may control the first switch group SG11 based on the first previous most significant bit MSB<1>. The first switch group SG11 may provide one end of the first capacitor C11 with any one of a plurality of voltages VDD, VCM and VS S under the control of the first decoder DEC11. The plurality of voltages VDD, VCM and VSS may include a power source voltage VDD, a reference voltage VCM and a ground voltage VSS. The reference voltage VCM may have an intermediate level between the power source voltage VDD and the ground voltage VSS. The first capacitor C11 may reflect a change in voltage level of the one end into the other end, i.e., the second node NN.

The check circuit 150 may check the validity of the current ramp signal based on a preset check voltage level. For example, the check circuit 150 may include a second DAC. The second DAC may include at least one decoder DEC21, at least one switch group SG21 and at least one capacitor C21. The decoder DEC21 may control the switch group SG21 based on the check control signal CK_CTRL. The switch group SG21 may provide one end of the capacitor C21 with any one of the voltages VDD, VCM and VSS under the control of the decoder DEC21. The capacitor C21 may reflect a voltage change occurring in one end into the other end, i.e., the second node NN of the signal processing circuit 130. In some implementations, the check circuit 150 may change a supply voltage from the reference voltage VCM to the power source voltage VDD through the switch group SG21, thereby increasing a voltage level of the second node NN of the signal processing circuit by the check voltage level. In some implementations, the check circuit 150 may change the supply voltage from the reference voltage VCM to the ground voltage VSS through the switch group SG21, thereby decreasing the voltage level of the second node NN of the signal processing circuit 130 by the check voltage level.

The shift circuit 160 may adjust the level of the current ramp signal VRMS using a preset shifting voltage level and provide the adjusted level to the ramp signal at the second node NN of the signal processing circuit 130. For example, the shift circuit 160 may include a third DAC. The third DAC may include a plurality of decoders DEC31 to DEC3Z, a plurality of switch groups SG31 to SG3Z and a plurality of capacitors C31 to C3Z. The plurality of capacitors C31 to C3Z may have the same capacitance. The capacitance of each of the capacitors C31 to C3Z may be equal to the capacitance of any one of the capacitors C11 to C1M included in the first DAC. For convenience in description, the first decoder DEC31, the first switch group SG31 and the first capacitor C31 are representatively described below. The first decoder DEC31 may control the first switch group SG31 based on the first shifting control signal SF_CTRL<1>. The first switch group SG31 may provide one end of the first capacitor C31 with any one of the voltages VDD, VCM and VSS under the control of the first decoder DEC31. The first capacitor C31 may reflect a change in voltage level of the one end into the other end, i.e., the second node NN.

The plurality of capacitors CC1 to C1M included in the voltage generating circuit 140 may be designed to have the same capacitance or different capacitances. The capacitor C21 included in the check circuit 150 and the plurality of capacitors C31 to C3Z included in the shift circuit 160 may be designed to have the same capacitance as any one of the capacitors C11 to C1M included in the voltage generating circuit 140. For example, the any one capacitor may have the smallest capacitance among the capacitors C11 to C1M.

Hereinafter, an operation of the image sensing device 100 having the above-described configuration in accordance with the present embodiment will be described with reference to FIGS. 4 to 6E.

Figure 4:
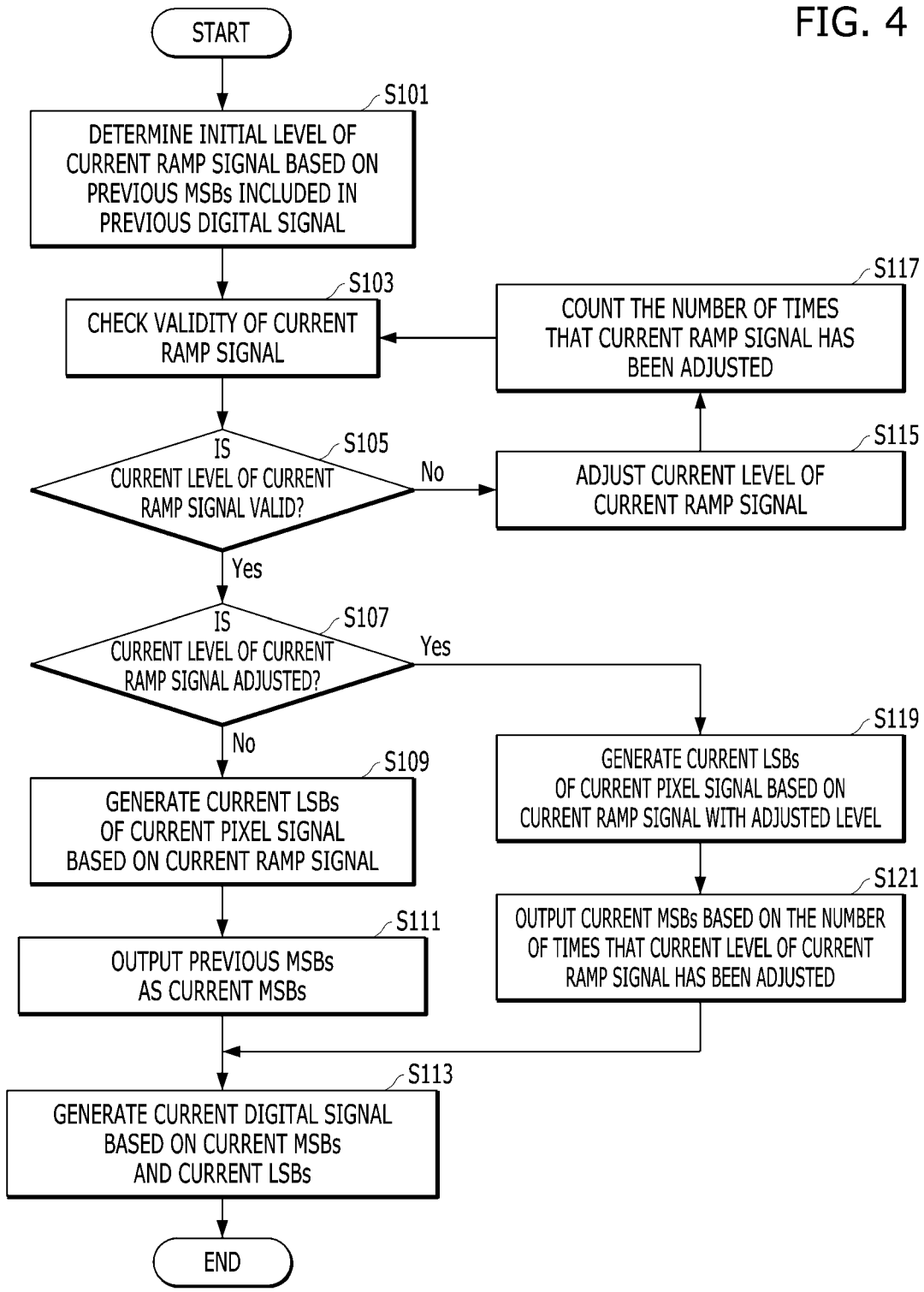
FIG. 4 shows an example of a flowchart showing operations of an image sensing device in accordance with an embodiment.

FIG. 4 is a flowchart illustrating an operation of the image sensing device 100 in accordance with an embodiment.

Referring to FIG. 4, at step S101, the voltage generating circuit 140 may determine the initial level of the currently sampled ramp signal VRMS based on the previous most significant bits MSBs<1:M> during the initial period $P_{initial}$ of the signal conversion period A/D.

At step S103, the check circuit 150 may check the validity of the initial level of the currently sampled ramp signal VRMS during the checking period $P_{check}$ of the signal conversion period A/D.

When the validity check result indicates that the initial level of the currently sampled ramp signal VRMS is valid ("YES" at step S105), it is determined at step 107 whether the initial level of the current ramp signal has been adjusted. If it is determined that the initial level of the current ramp signal is not adjusted ("NO" at step S107), the signal processing circuit 130 may begin to generate least significant bits LSBs of the currently sampled pixel signal VPXS during the fine period $P_{fine}$ at step S109. At step 111, the signal processing circuit 130 may generate the current most significant bits MSBs as same as the most significant bits MSBs<1:M> in the first digital output. Although FIG. 4 shows that the step S109 proceeds prior to the step S111, other implementations are possible and thus, the step S111 can proceed after the step S109. At step S113, the signal processing circuit 130 may generate the current digital output DPX, i.e., the second digital output based on the generated MSBs and the generated LSBs.

When the validity check result indicates that the initial level of the currently sampled ramp signal VRMS is not valid ("NO" at step S105), the process proceeds to the step S115 where the shift circuit 160 may adjust the initial level of the currently sampled ramp signal VRMS during the shifting period $P_{shift}$. At step S117, the count bit generation circuit 139 may count the number of times that the level of the currently sampled ramp signal VRMS has been adjusted or shifted, and generate the count bit CNT indicating the number of times.

At step 103, the check circuit 150 may check the validity of the adjusted voltage level of the currently sampled ramp signal VRMS. Depending on the results at step S105, the steps S115, S117, S103 may be repeated until the adjusted voltage level is valid. At step S107, if the validity check result indicates that the current level of the currently sampled ramp signal VRMS is valid ("YES" at step S105), the process proceeds to step S107 to determine whether the current level of the currently sampled ramp signal VRMS has been adjusted. If it is determined that the current level of the currently sampled ramp signal VRMS has been adjusted ("YES" at step S107), the signal processing circuit 130 may generate the current least significant bits of the currently sampled pixel signal VPXS during the fine period $P_{fine}$ at step S119. The signal processing circuit 130 may generate the most significant bits MSBs by reflecting the count bit CNT into the previous most significant bits MSBs<1:M> at step S121. Although FIG. 4 shows that the step S119 proceeds prior to the step S121, other implementations are possible and thus, the step S121 can proceed after the step S119. The signal processing circuit 130 may generate the current digital output DPX at step S113.

FIGS. 5A-5C and 6A-6E are examples of graphs for describing an operating method of the image sensing device 100. FIGS. 5A-5C and 6A-6E illustrate a case where the voltage level of the currently sampled pixel signal VPXS is higher than the initial level of the currently sampled ramp signal VRMS. In FIGS. 5A-5C and 6A-6E, "VPXS[n]"

denotes a currently sampled pixel signal, "VPXS[n−1]" denotes a previously sampled pixel signal, and "SL" denotes an initial level of the most significant bits MSBs<1:M> of the previously processed digital output of the previously sampled pixel signal VPXS[n−1], e.g., the first pixel signal.

Figure 5A:
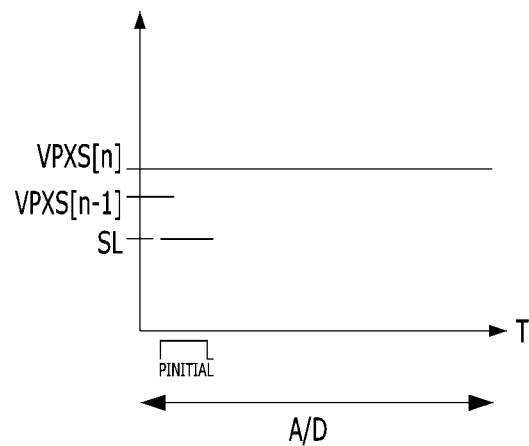
FIGS. 5A to 5C show examples of graphs showing voltage levels of current pixel signal and ramp signal in accordance with an embodiment.
Figure 5B:
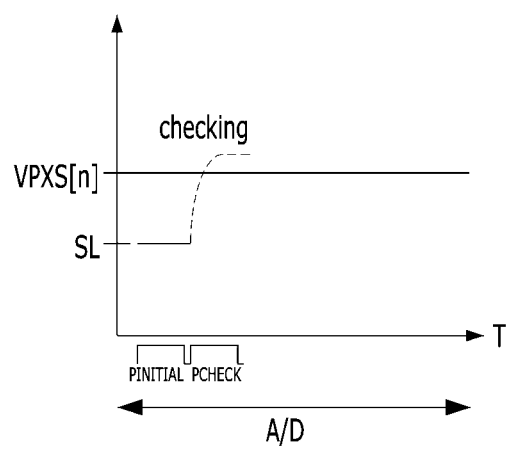
Figure 5C:
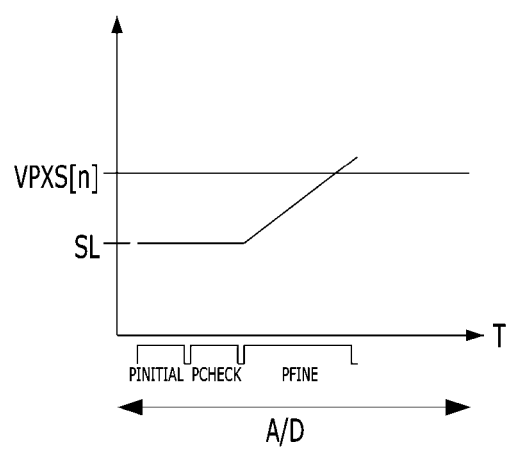

FIGS. 5A-5C illustrate a case where the initial level of the currently sampled ramp signal VRMS is valid without any shifting or adjusting operation.

Referring to FIG. 5A, the voltage generating circuit 140 may determine the initial level SL of the currently sampled ramp signal VRMS based on the most significant bits MSBs<1:M> of the previously processed digital output, and provide the initial level to the second node NN of the currently sampled ramp signal VRMS. In this case, the comparison circuit 131 may compare the initial level SL of the currently sampled ramp signal VRMS with a voltage level of the currently sampled pixel signal VPXS[n], and generate the comparison signal VC based on the comparison result. When the comparison circuit 131 generates the comparison signal VC indicating that the voltage level of the currently sampled pixel signal VPXS[n] is higher than the initial level SL of the currently sampled ramp signal VRMS, the control circuit 133 may generate the check control signal CK_CTRL.

In response to the check control signal CK_CTRL from the control circuit 133, the check circuit 150 may check the validity of the start level SL of the currently sampled ramp signal VRMS, as shown in FIG. 5B. To check the validity, the check circuit 150 may increase the currently sampled ramp signal VRMS at the second node NN by a predetermined check voltage level based on the check control signal CK_CTRL. The comparison circuit 131 may compare the voltage level of the currently sampled pixel signal VPXS[n] with a voltage level of the currently sampled ramp signal VRMS, which is obtained by adding the second voltage level to the initial level SL. The comparison circuit 131 may generate the comparison signal VC based on the comparison result. In this example, since the voltage level of the currently sampled pixel signal VPXS[n] is lower than the increased voltage level of the currently sampled ramp signal VRMS, which is obtained by adding the check voltage level to the initial level SL and, the comparison circuit 131 determines that the initial level SL is valid.

Once the comparison signal VC is outputted from the comparison circuit 131 as the result of the validity check, the check circuit 150 initializes the voltage level of the currently sampled ramp signal VRMS to the previous state level, i.e., the initial level SL. In some implementations, the initialization of the voltage level of the currently sampled ramp signal VRMS can be invoked by a corresponding control signal from the control circuit 133. In some implementations, the initialization of the voltage level of the currently sampled ramp signal VRMS can be invoked upon the receipt of the comparison signal VC outputted from the comparison circuit 131 as the result of the validity check.

In FIG. 5C, the fine period $P_{fine}$ of the signal conversion period A/D starts such that the currently sampled ramp signal VRMS ramps on a fine basis from the initial level SL to a predetermined target level. The comparison circuit 131 compares the currently sampled ramp signal VRMS with the currently sampled pixel signal VPXS[n] and generates the comparison signal VC based on the comparison result. A difference between the target level and the initial level SL may be a voltage level corresponding to the coarse unit of 1MSB. During the fine period Prime of the signal conversion period A/D, when the control circuit 133 generates the fine control signal FN_CTRL based on the comparison signal VC, the LSB generation circuit 135 may generate the least significant bits of the currently sampled pixel signal VPXS[n], that is, the current least significant bits LSBs, based on the fine control signal FN_CTRL.

FIGS. 6A-6E illustrate a case where the initial level of the currently sampled ramp signal VRMS is not valid.

Figure 6A:
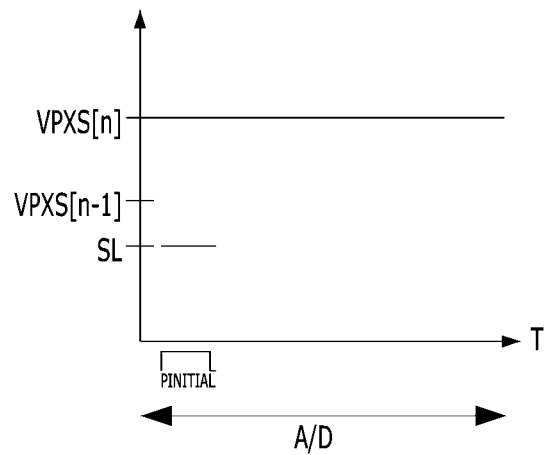
FIGS. 6A to 6E show examples of graphs showing voltage levels of current pixel signal and ramp signal in accordance with an embodiment.
Figure 6B:
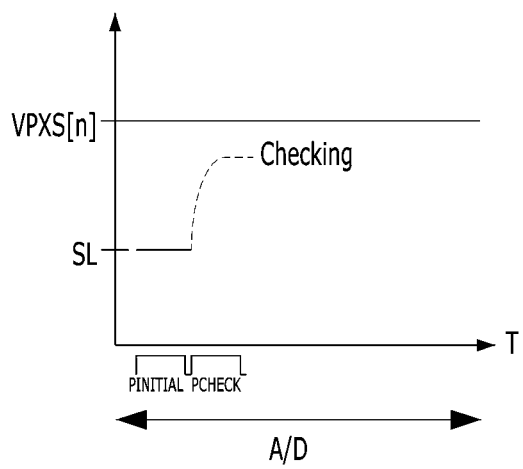

The operations as shown in FIGS. 6A and 6B can be understood based on the descriptions on FIGS. 5A and 5B except that the voltage level of the currently sampled pixel signal VPXS[n] is still higher than the increased voltage level of the currently sampled ramp signal VRMS, which is obtained by adding the check voltage level to the initial level SL. Thus, unlike the example in FIG. 5B, the initial level SL is determined as not valid.

Referring to FIG. 6A, the determination circuit 140 may determine the start level SL of the currently sampled ramp signal VRMS based on the previous most significant bits MSBs<1:M> and provide the initial level to the second node NN of the currently sampled ramp signal VRMS. In this case, the comparison circuit 131 may compare the initial level SL of the currently sampled ramp signal VRMS with a voltage level of the currently sampled pixel signal VPXS[n], and generate the comparison signal VC based on the comparison result. When the comparison circuit 131 generates the comparison signal VC indicating that the voltage level of the currently sampled pixel signal VPXS[n] is higher than the initial level SL of the currently sampled ramp signal VRMS, the control circuit 133 may generate the check control signal CK_CTRL.

In response to the check control signal CK_CTRL from the control circuit 133, the check circuit 150 may check the validity of the start level SL of the currently sampled ramp signal VRMS as shown in FIG. 6B. To check the validity, the check circuit 150 may increase the currently sampled ramp signal VRMS at the second node NN by a predetermined check voltage level based on the check control signal CK_CTRL. The comparison circuit 131 may compare the voltage level of the currently sampled pixel signal VPXS[n] with a voltage level of the currently sampled ramp signal VRMS, which is obtained by adding the second voltage level to the initial level SL. In some implementations, The comparison circuit 131 may generate the comparison signal VC based on the comparison result, and the control circuit 133 may initialize the check circuit 150 based on the comparison signal VC, and generate the shifting control signals SF_CTRL<1:Z> indicating the increase of the voltage level. In this example, since the voltage level of the currently sampled pixel signal VPXS[n] is higher than the increased voltage level of the currently sampled ramp signal VRMS, which is obtained by adding the start level SL and the second voltage level, the start level SL is not valid. Once the comparison signal VC is outputted from the comparison circuit 131 as the result of the validity check, the check circuit 150 may initialize the voltage level of the currently sampled ramp signal VRMS by returning its value to the previous state level, i.e., the initial level SL. In addition, in response to the determination that the initial level SL is not valid, the shifting period $P_{shift}$ starts based on the shifting control signals SF_CTRL<1:Z>.

Figure 6C:
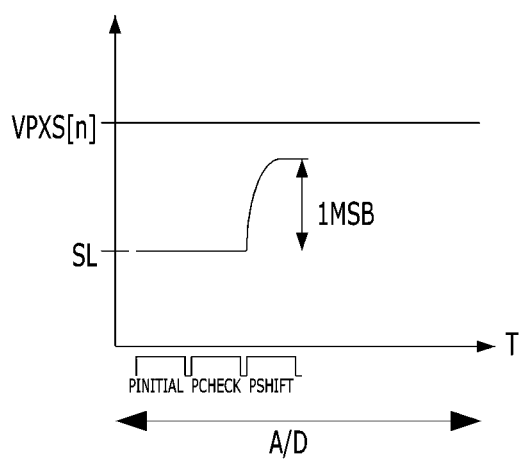

As shown in FIG. 6C, during the shifting period $P_{shift}$ of the signal conversion period A/D, the shift circuit 160 may increase the currently sampled ramp signal VRMS at the second node NN of the signal processing circuit 130 by a predetermined shifting voltage level based on the shifting control signals SF_CTRL<1:Z>. For example, the shifting voltage level may be equal to the check voltage level and correspond to the coarse unit, e.g., 1MSB.

Figure 6D:
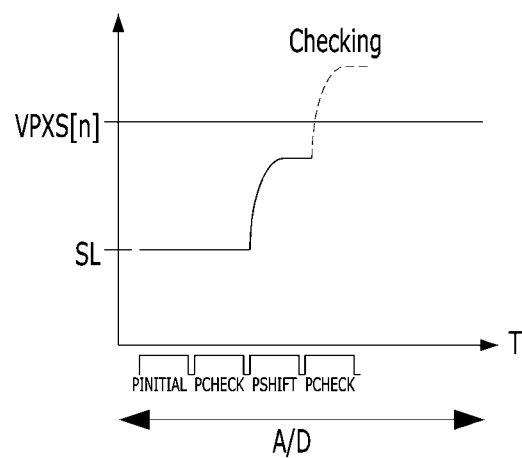

In FIG. 6D, the checking period $P_{check}$, proceeds such that the check circuit 150 may check validity of a voltage level of the currently sampled ramp signal VRMS, that is, a level obtained by adding the shift voltage level to the initial level SL. For example, the check circuit 150 may increase the currently sampled ramp signal VRMS at the second node NN of the signal processing circuit 130 by the check voltage level based on the check control signal CK_CTRL. The comparison circuit 131 may compare the voltage level of the currently sampled ramp signal VRMS, which is a level obtained as the sum of the initial level SL, the shifting voltage level, and the check voltage level, with the voltage level of the currently sampled pixel signal VPXS[n]. The comparison circuit 131 may generate the comparison signal VC based on the comparison result. Once the comparison signal VC is outputted from the comparison circuit 131 as the result of the validity check, the check circuit 150 may initialize the voltage level of the currently sampled ramp signal VRMS based on the comparison signal VC. At this time, since the voltage level of the currently sampled pixel signal VPXS[n] is lower the voltage level of the currently sampled ramp signal VRMS, which is obtained as the sum of the initial level SL, the shifting voltage level and the check voltage level, the comparison circuit 131 provides the comparison signal VC indicating that the adjusted voltage level is valid. Once the comparison signal VC is outputted from the comparison circuit 131 as the result of the validity check, the check circuit 150 may initialize the voltage level of the currently sampled ramp signal VRMS by returning its value to a previous state level, that is, the level obtained by adding the shifting voltage level to the initial level SL.

Figure 6E:
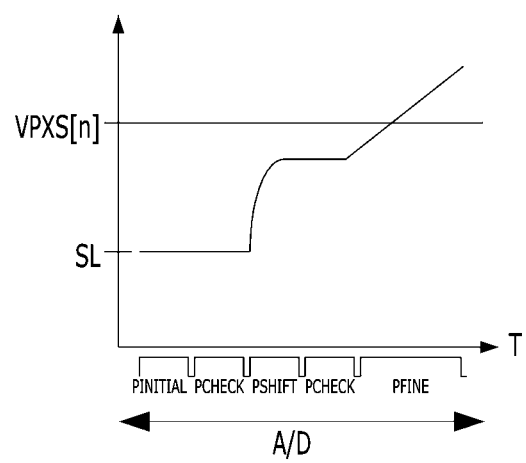

In FIG. 6E, the fine period Prime of the signal conversion period A/D starts such that the currently sampled ramp signal VRMS ramps on a fine basis from the adjusted voltage level to a predetermined target level. The adjusted voltage level corresponds to the level obtained by adding shifting voltage level to the initial level SL. The comparison circuit 131 compares the currently sampled ramp signal VRMS with the currently sampled pixel signal VPXS[n], and generates the comparison signal VC based on the comparison result. A difference between the target level and the initial level SL may be a voltage level corresponding to the coarse unit of 1MSB. During the fine period $P_{fine}$ of the signal conversion period A/D, when the control circuit 133 generates the fine control signal FN_CTRL based on the comparison signal VC, the LBS generation circuit 135 and the MSB generation circuit 137 may perform their operations. The LSB generation circuit 135 may generate the least significant bits of the currently sampled pixel signal VPXS[n], that is, the current least significant bits LSBs, based on the fine control signal FN_CTRL. The MSB generation circuit 137 may generate the most significant bits MSBs of the currently sampled pixel signal VPXS[n] based on the count bit CNT and the most significant bits MSBs<1:M> of the previously processed digital output. The count bit CNT may correspond to the number of times that the level of the currently sampled ramp signal VRMS has been adjusted or shifted.

Figure 7:
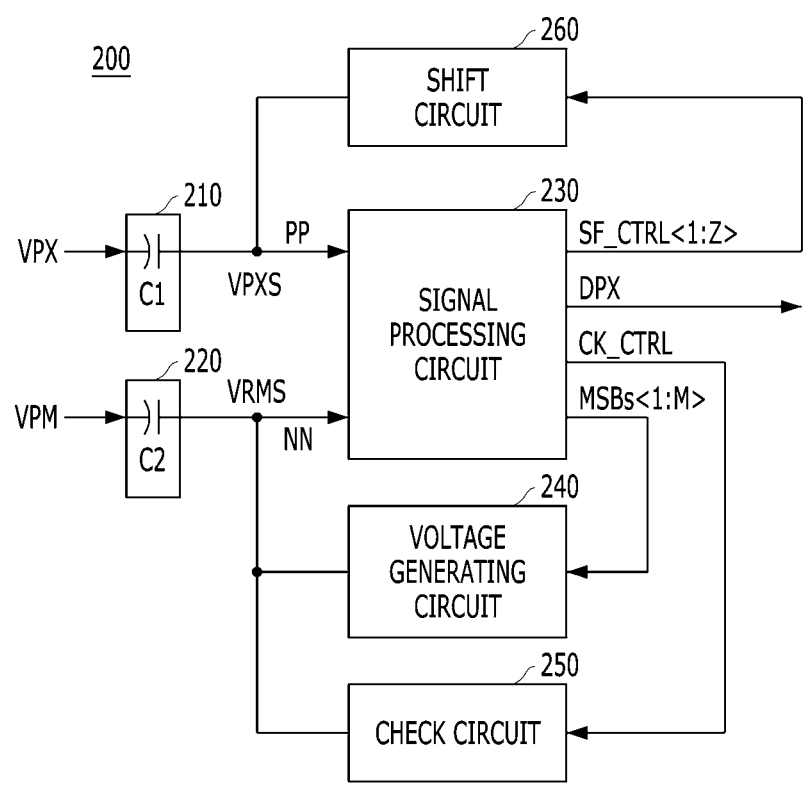
FIG. 7 is an example of a block diagram illustrating an image sensing device in accordance with an embodiment.

FIG. 7 is a block diagram illustrating an image sensing device 200 in accordance with an embodiment.

Referring to FIG. 7, the image sensing device 200 may include a first sampling circuit 210, a second sampling circuit 220, a signal processing circuit 230, a voltage generating circuit 240, a check circuit 250 and a shift circuit 260.

Since the operations and the structures of the first sampling circuit 210, the second sampling circuit 220, the signal processing circuit 230, the voltage generating circuit 240 and the check circuit 250 can be understood based on the descriptions of the first sampling circuit 110, the second sampling circuit 120, the signal processing circuit 130, the voltage generating circuit 140 and the check circuit 150, detailed descriptions thereof will be omitted.

In FIG. 7, the shift circuit 260 may be coupled to a first node PP of the signal processing circuit 120. The shift circuit 260 may adjust an initial level of the sampled pixel signal VPXS based on shifting control signals SF_CTRL<1:Z>. For example, the shift circuit 260 may increase or decrease the initial level of the currently sampled pixel signal VPXS by the coarse unit of 1MSB based on a check result from the check circuit 250.

Figure 8:
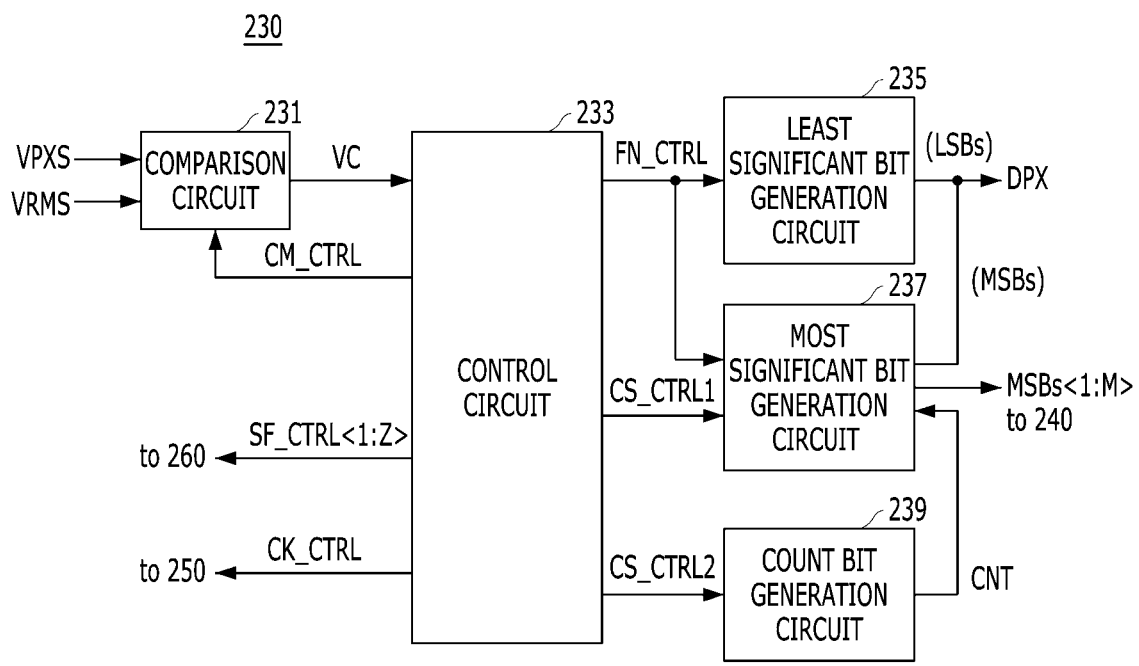
FIG. 8 is an example of a configuration diagram illustrating a signal processing circuit shown in FIG. 7.

FIG. 8 is an example of an internal configuration diagram illustrating the signal processing circuit 230 shown in FIG. 7.

Referring to FIG. 8, the signal processing circuit 230 may include a comparison circuit 231, a control circuit 233, a LSB generation circuit 235, a MSB generation circuit 237, and a count bit generation circuit 239.

Since the operations and the structures of the comparison circuit 231, the control circuit 233, the LSB generation circuit 235, the MSB generation circuit 237 and the count bit generation circuit 239 can be understood based on the descriptions of the comparison circuit 131, the control circuit 133, the LSB generation circuit 135, the MSB generation circuit 137 and the count bit generation circuit 139, detailed descriptions thereof will be omitted.

Figure 9:
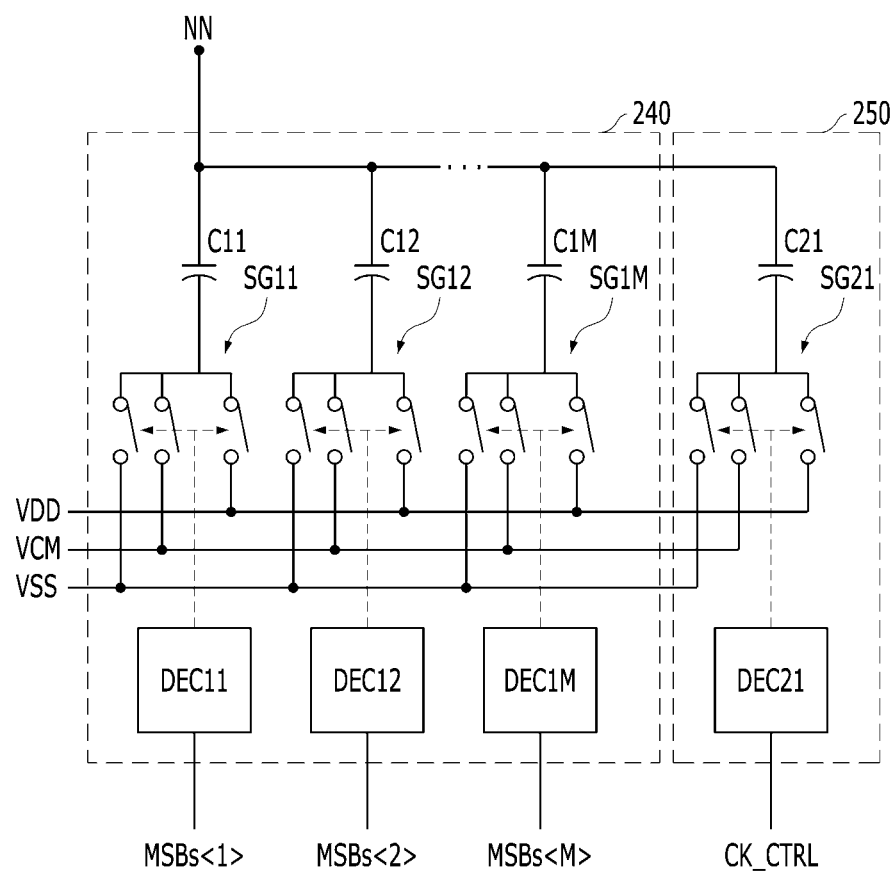
FIG. 9 is an example of a configuration diagram illustrating a voltage generating circuit and a check circuit shown in FIG. 7.
Figure 10:
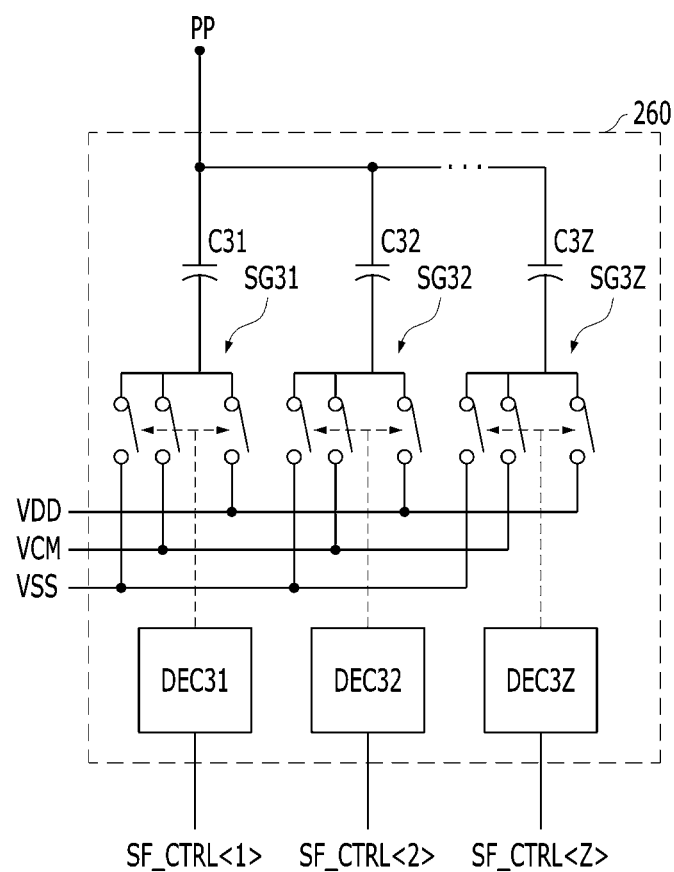
FIG. 10 is an example of a configuration diagram illustrating a shift circuit shown in FIG. 7.

FIG. 9 is an example of a configuration diagram illustrating the voltage generating circuit 240 and the check circuit 250 shown in FIG. 7. FIG. 10 is an example of s configuration diagram illustrating the shift circuit 260 shown in FIG. 7.

Since the operations and the structures of the internal configurations of the voltage generating circuit 240, the check circuit 250 and the shift circuit 260 can be understood based on the descriptions of the voltage generating circuit 140, the check circuit 150 and the shift circuit 160 which have been described in the above embodiment, detailed descriptions thereof will be omitted.

Hereinafter, an operation of the image sensing device 200 having the above-described configuration in accordance with the present embodiment will be described with reference to FIGS. 11 to 13E.

Figure 11:
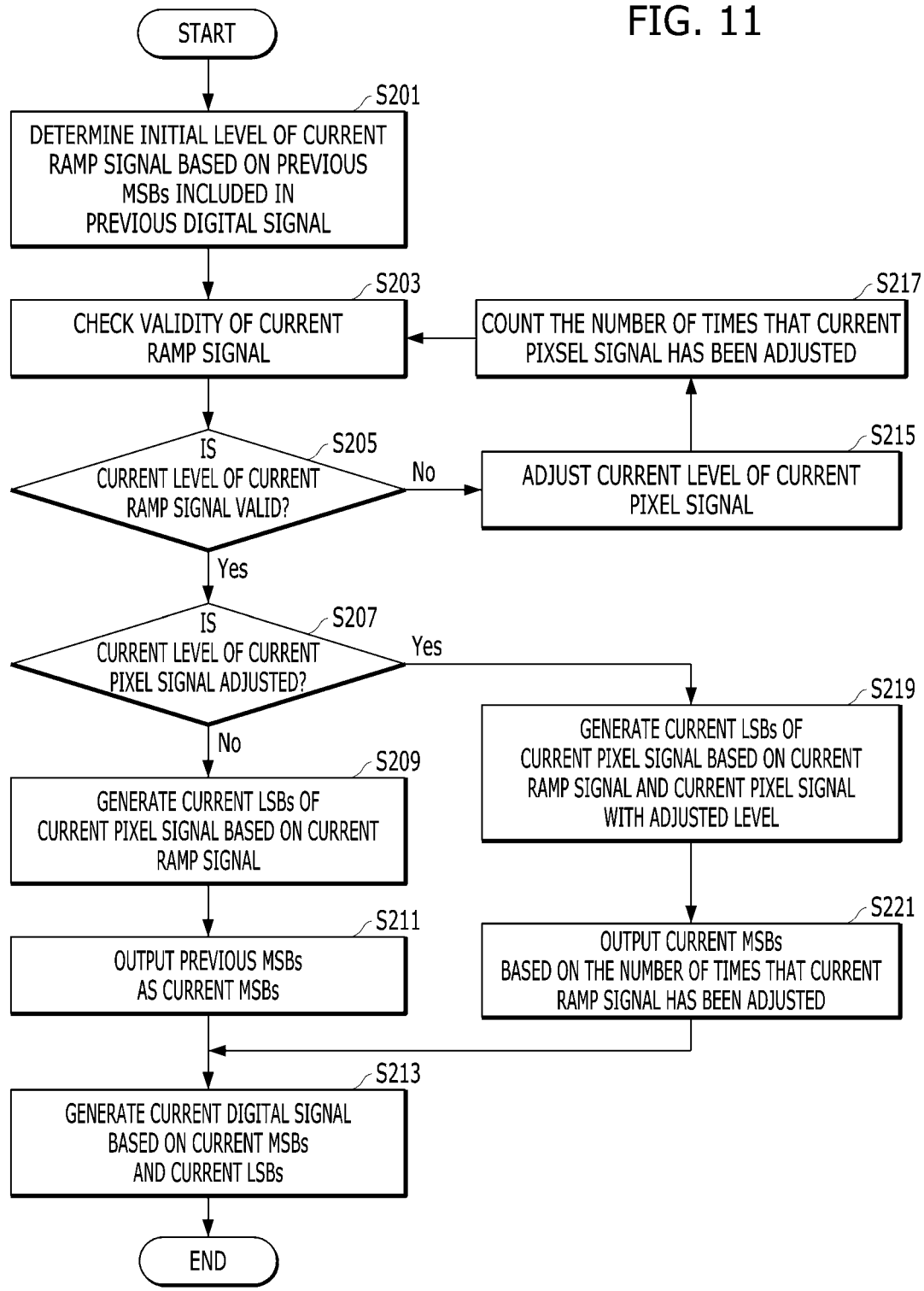
FIG. 11 shows an example of a flowchart showing operations of an image sensing device in accordance with an embodiment.

FIG. 11 is a flowchart illustrating an operating method of the image sensing device 200 in accordance with an embodiment.

The steps S201 to S213, which proceeds as the check result that the initial level of the current ramp signal is valid, are substantially same as steps S101 to S113 as described with FIG. 4, and thus the detailed descriptions thereof will be omitted. Hereafter, an operating method of the image sensing device 200 will be discussed mainly for a case that the check result at the step S205 shows that the initial level of the currently sampled ramp signal VRMS is not valid.

When a result of checking validity of the currently sampled ramp signal VRMS indicates that the initial level of the currently sampled ramp signal VRMS is not valid ("NO" at step S205), the process proceeds to the step S205 where the shift circuit 260 may adjust or shift a voltage level of the currently sampled pixel signal VPXS. The adjusting or shifting of the voltage level may be done during the shifting period $P_{shift}$ of the signal conversion period A/D. At step S217, the count bit generation circuit 239 may count the number of times that the voltage level of the currently sampled pixel signal VPXS has been adjusted, and generate a count bit CNT, for the shifting period $P_{shift}$.

At step S203, the check circuit 250 may recheck the validity of the adjusted voltage level of the currently sampled ramp signal VRMS by reentering the checking period $P_{check}$ Depending on the results at step S205, the steps S215, S217, S203 may be repeated until the adjusted voltage level is valid. When the validity check at step S205 result indicates that the initial level of the currently sampled ramp signal VRMS is valid ("YES" at step S205), the process proceeds to the step S207 to determine whether the voltage level of the currently sampled pixel signal VPXS is adjusted. If "YES" at step S207, the signal processing circuit 230 may generate current least significant bits of the currently sampled pixel signal VPXS during the fine period Prime at step S219, and generate current most significant bits MSBs by reflecting the count bit CNT into previous most significant bits MSBs<1:M> at step S221, and thus generate a current digital output DPX at step S213. Although FIG. 11 shows that the step S219 proceeds prior to the step S221, other implementations are possible and thus, the step S221 can be proceed after the step S219.

FIGS. 12A to 12C and FIGS. 13A to 13E are examples of graphs for describing an operating method of the image sensing device 200. FIGS. 12A-12C and 13A-13E illustrate a case where the voltage level of the currently sampled pixel signal VPXS is higher than the initial level of the currently sampled ramp signal VRMS. In FIGS. 12A-12C and 13A-13E, "VPXS[n]" denotes a currently sampled pixel signal, "VPXS[n−1]" denotes a previously sampled pixel signal, and "SL" denotes the initial level corresponding to the most significant bits MSBs<1:M> of the previously sampled pixel signal VPXS[n−1].

Figure 12A:
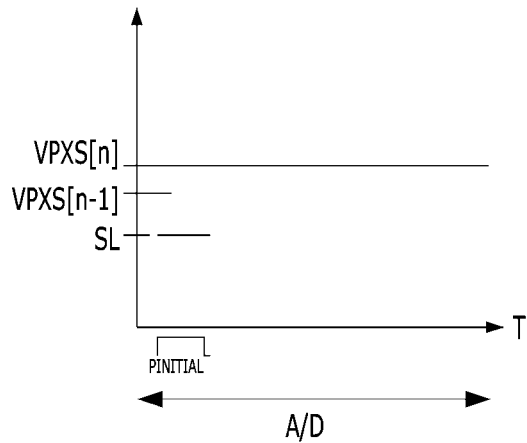
FIGS. 12A to 12C show examples of graphs showing voltage levels of current pixel signal and ramp signal in accordance with an embodiment.
Figure 12B:
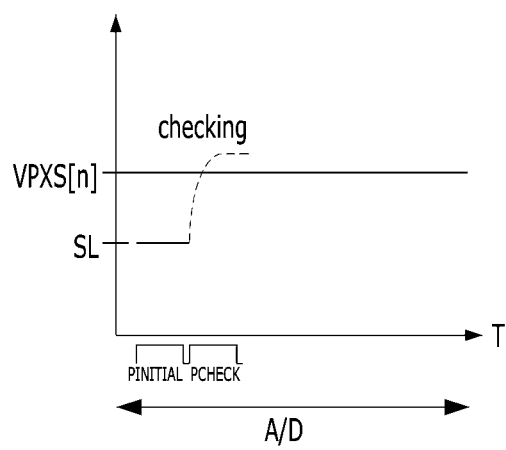
Figure 12C:
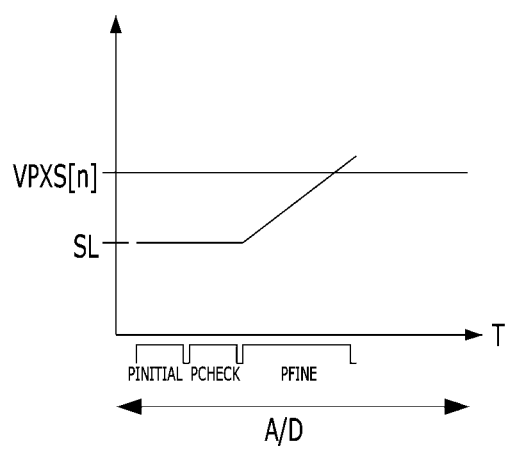

FIGS. 12A to 12C illustrate the graphs describing a case where the initial level of the currently sampled ramp signal VRMS is valid. FIGS. 13A to 13E illustrate the graphs describing a case where the initial level of the currently sampled ramp signal VRMS is not valid.

Since the case where the initial level of the currently sampled ramp signal VRMS is valid is substantially the same as that described in FIGS. 5A-5C, detailed descriptions thereof will be omitted. Hereinafter, the case where the initial level of the currently sampled ramp signal VRMS is not valid will be described.

Figure 13A:
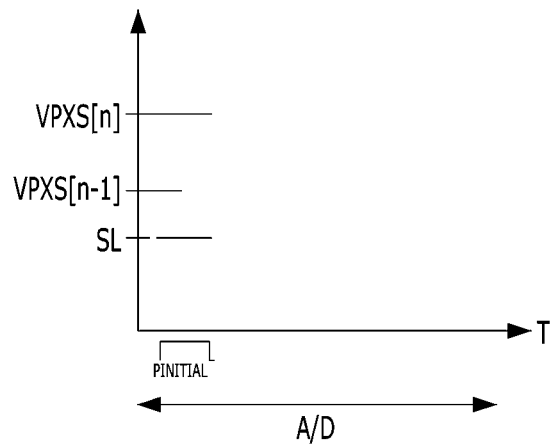
FIGS. 13A to 13E show examples of graphs showing voltage levels of current pixel signal and ramp signal in accordance with an embodiment.

Referring to FIG. 13A, the voltage generating circuit 240 may determine the initial level SL of the currently sampled ramp signal VRMS based on the most significant bits MSBs<1:M> of the previously processed digital output and provide the initial level to the second node NN of the currently sampled ramp signal VRMS. In this case, the comparison circuit 231 may compare the initial level SL of the currently sampled ramp signal VRMS with a voltage level of the currently sampled pixel signal VPXS[n], and generate a comparison signal VC based on the comparison result. When the comparison circuit 231 generates the comparison signal VC indicating that the voltage level of the currently sampled pixel signal VPXS[n] is higher than the initial level SL of the currently sampled ramp signal VRMS, the control circuit 233 may generate the check control signal CK_CTRL.

Figure 13B:
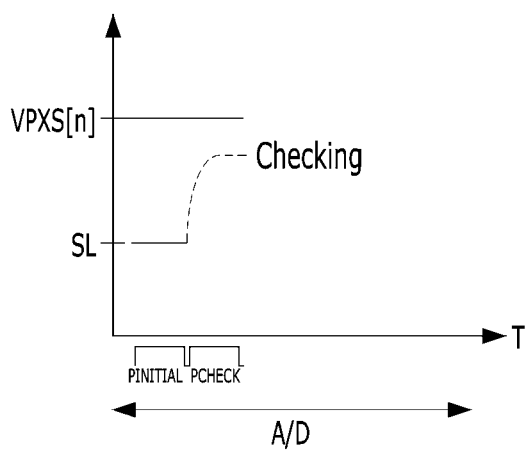

In response to the check control signal CK_CTRL from the control circuit 233, the check circuit 250 may check the validity of the initial level SL of the currently sampled ramp signal VRMS during the checking period $P_{check}$ of the signal conversion period A/D, as shown in FIG. 13B. For example, the check circuit 250 may increase the currently sampled ramp signal VRMS at the second node NN by a predetermined check voltage level. The check voltage level may correspond to the coarse unit of 1MSB. Then, the comparison circuit 231 may compare a voltage level of the currently sampled ramp signal VRMS, which is obtained by adding the check voltage level to the initial level SL, with the voltage level of the currently sampled pixel signal VPXS[n], and generate the comparison signal VC based on the comparison result. Based on the comparison signal VC, the control circuit 233 may generate the shifting control signals SF_CTRL<1:Z>. In this example of FIG. 13B, since the voltage level of the currently sampled pixel signal VPXS[n] is higher than the voltage level of the currently sampled ramp signal VRMS, which is obtained by adding the check voltage level to the initial level SL, the comparison circuit 231 outputs the comparison signal VC indicating that the initial level SL is not valid. The check circuit 250 may initialize the voltage level of the currently sampled ramp signal VRMS by returning its value to a previous state level, i.e., the initial level SL. In addition, in response to the determination that the initial level SL is not valid, the shifting period $P_{shift}$ starts based on the shifting control signals SF_CTRL<1:Z>.

Figure 13C:
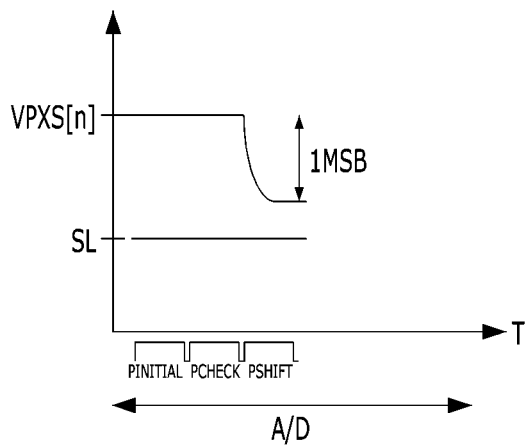

As shown in FIG. 13C, during the shifting period $P_{shift}$ of the signal conversion period A/D, the shift circuit 260 may decrease the currently sampled pixel signal VPXS at the second node NN by a predetermined shifting voltage level based on the shifting control signals SF_CTRL<1:Z>. For example, the shifting voltage level may correspond to the coarse unit of 1MSB.

Figure 13D:
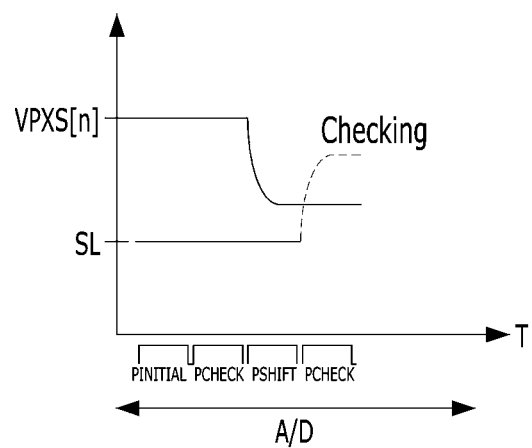
Figure 13E:
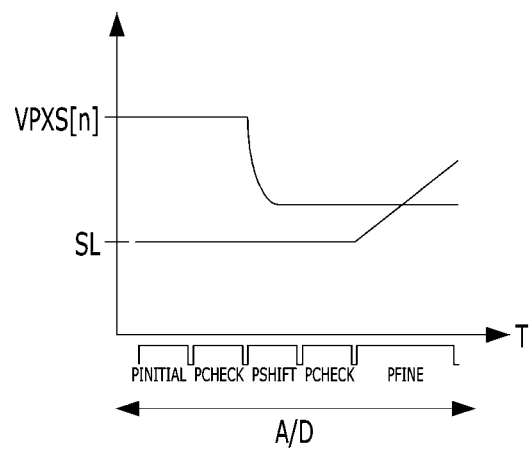

In FIG. 13D, the checking period $P_{check}$ proceeds such that the check circuit 250 may check validity of a voltage level of the currently sampled ramp signal VRMS, that is, a level obtained by adding the shifting voltage level to the initial level SL. For example, the check circuit 250 may increase the currently sampled ramp signal VRMS at the generation node NN of by the check voltage level based on the check control signal CK_CTRL. The comparison circuit 231 may compare the voltage level of the currently sampled ramp signal VRMS, which is the level obtained by adding the check voltage level to the initial level SL, with an adjusted voltage level of the currently sampled pixel signal VPXS[n], and generate the comparison signal VC based on the comparison result. In this example, since the adjusted voltage level of the currently sampled pixel signal VPXS[n] is lower than the voltage level of the currently sampled ramp signal VRMS, which is the level obtained by adding the check voltage level to the initial level SL, the comparison circuit 231 outputs the comparison signal VC indicating that the initial level of the currently sampled ramp signal VRMS is valid as compared with the adjusted voltage level of the currently sampled pixel signal VPXS[n]. The check circuit 250 may initialize the currently sampled ramp signal VRMS by returning the voltage level of the currently sampled ramp signal VRMS to the previous state level, that is, the initial level SL.

In response to the comparison signal VC indicating that the voltage level of the currently sampled ramp signal VRMS is valid, the fine period $P_{fine}$ proceeds. For the fine period $P_{fine}$ of the signal conversion period A/D, the currently sampled ramp signal VRMS ramps on a fine basis from the initial level to a predetermined target level, and the comparison circuit 231 compares the currently sampled ramp signal VRMS with the currently sampled pixel signal VPXS[n], and generates the comparison signal VC corresponding to the comparison result, as shown in graph (E). For the fine period $P_{fine}$ of the signal conversion period A/D, when the control circuit 233 generates a fine control signal FN_CTRL corresponding to the comparison signal VC, the LSB generation circuit 235 may generate the least significant bits LSBs of the currently sampled pixel signal VPXS[n] based on the fine control signal FN_CTRL, and the MSB generation circuit 237 may generate the most significant bits MSBs of the currently sampled pixel signal VPXS[n] by reflecting the count bit CNT to the previous most significant bits MSBs<1:M> based on the fine control signal FN_CTRL. The count bit CNT may indicate the number of times that the voltage level of the currently sampled pixel signal VPXS[n] has been adjusted.

As is apparent from the above descriptions, the image sensing device in accordance with the embodiments can realize low power and a high-speed operation by using previous most significant bits when converting a pixel signal into a digital output.

In accordance with the embodiments, the image sensing device can convert a pixel signal into a digital output, i.e., analog-to-digital conversion (ADC), at high speed and low power. For example, the image sensing device can exert a more excellent effect when photographing an image moving at high speed.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. An image sensing device comprising:
   an image sensing region including a first pixel and a second pixel that produce a first pixel signal and a second pixel signal, respectively, in response to reception of light incident on the image sensing region; and
   a signal processing circuit electrically coupled to the image sensing region and operable to convert the first pixel signal and the second pixel signal to a first digital output and a second digital output, respectively, the signal processing circuit including a first node configured to receive the first pixel signal and the second pixel signal and a second node configured to receive ramp signals used for conversion of the first pixel signal and the second pixel signal; and
   a check circuit coupled to the signal processing circuit and operable to check a validity of a ramp signal applied to the second node for the conversion of the second pixel signal and provide a check result, and
   wherein the signal processing circuit is configured to repeatedly adjust, during a first period, the second pixel signal applied to the first node or the ramp signal applied to the second node until the check result indicates the ramp signal as valid, and to generate one or more most significant bits (MSBs) of the second digital output based on i) previous one or more MSBs of the first digital output and ii) the number of times that the ramp signal or the second pixel signal has been adjusted.

2. The image sensing device of claim 1, wherein the signal processing circuit is configured to generate one or more least significant bits (LSBs) of the second digital output using the ramp signal during a second period, the ramp signal having a smaller change rate during the second period as compared to the first period.

3. The image sensing device of claim 1, further including:
   a voltage generating circuit coupled to the signal processing circuit and operable to set, based on the previous MSBs, an initial level of the ramp signal applied to the second node; and
   a shift circuit coupled to the signal processing circuit and operable to adjust the ramp signal or the second pixel signal based on the check result.

4. The image sensing device of claim 1, wherein the check circuit includes a second digital to analog converter (DAC) and is configured to increase the ramp signal by a preset check voltage.

5. The image sensing device of claim 3, wherein the voltage generating circuit includes a first digital to analog converter (DAC) and is operable to receive the previous MSBs.

6. The image sensing device of claim 3, wherein the shift circuit includes a third digital to analog converter (DAC) and is operable to increase the ramp signal by a preset shift level or decrease the second pixel signal by the preset shift level.

7. The image sensing device of claim 1, wherein the signal processing circuit includes a count circuit that is configured to count, based on a corresponding control signal, the number of times that the ramp signal or the second pixel signal has been adjusted.

8. The image sensing device of claim 1, wherein the signal processing circuit includes a comparison circuit that is configured to compare the ramp signal with the second pixel signal.

9. The image sensing device of claim 1, wherein the ramp signal has an initial level corresponding to the previous one or more MSBs of the first digital output or an increased level from the initial level during the first period.

10. The image sensing device of claim 9, wherein the ramp signal value is adjustable from the initial level or the increased level to a predetermined target level.

11. The image sensing device of claim 1, wherein the signal processing circuit includes a control circuit configured to generate a first control signal and a second control signal to invoke the first period and the second period, respectively.

12. The image sensing device of claim 1, wherein the signal processing circuit further comprises a sampling region including:
   a first sampling circuit to receive the second pixel signal and to perform sampling on the received second pixel signal, the sampled pixel signal provided to the first node; and
   a second sampling circuit to receive the ramp signal and to perform sampling on the received ramp signal, the sampled ramp signal provided to the second node.

13. An image sensing device comprising:
a first sampling circuit configured to sample a pixel signal and output a sampled pixel signal to a first node;
a second sampling circuit configured to sample a ramp signal and output a sampled ramp signal to a second node;
a signal processing circuit coupled to the first node and the second node and configured to generate a digital signal based on the sampled pixel signal and the sampled ramp signal;
a voltage generating circuit coupled to the second node and configured to determine a start level of the sampled ramp signal based on one or more previous most significant bits (MSBs) included in a previous digital signal; and
a check circuit coupled to the signal processing circuit and operable to check a validity of the sampled ramp signal applied to the second node and provide a check result, and
wherein the signal processing circuit is configured to repeatedly adjust, during a first period, the sampled pixel signal applied to the first node or the sampled ramp signal applied to the second node until the check result indicates the sampled ramp signal as valid, and to generate one or more most significant bits (MSBs) of the digital signal based on i) previous one or more MSBs of a previously processed digital output and ii) the number of times that the sampled ramp signal or the sampled pixel signal has been adjusted.

14. A method for operating an image sensing device, the method comprising:
(a) receiving a current pixel signal and a ramp signal, the ramp signal having an initial level determined based on information included in a previously processed digital output obtained by processing a previous pixel signal;
(b) determining, during a check period, whether the ramp signal is valid or not;
(c) adjusting, during a shift period, the ramp signal or the current pixel signal by a preset shift level when the determination indicates that the ramp signal is invalid;
(d) selectively repeating operations (b) and (c) until the determination indicates that the ramp signal is valid; and
(e) generating a current digital output including one or more MSBs obtained based on information included in the previously processed digital output and the number of adjustments.

15. The method of claim 14, wherein the generating of the current digital output includes generating one or more current LSBs based on the ramp signal having a smaller change rate as compared to that of the ramp signal used during the shifting period.

16. The method of claim 14, wherein the information included in a previously processed digital output includes previous one or more MSB(s) of the previously processed digital output.

17. The method of claim 14, wherein the operation (b) includes increasing the ramp signal by a preset check level and comparing the increased ramp signal with the current pixel signal.

18. The method of claim 17, further including, after operation (b) and before operation (c), initializing the ramp signal by returning the increased ramp signal to an original level before the increase.

19. The method of claim 17, wherein the preset check level is the same as the preset shifting level.

20. The method of claim 14, wherein the determining is made based on whether a difference between the current pixel signal and the ramp signal is within a range corresponding to 1 MSB.

* * * * *